United States Patent [19]

Onaga et al.

[11] Patent Number: 4,807,153

[45] Date of Patent: Feb. 21, 1989

[54] MULTIAXIS DIGITAL ROBOT CONTROL HAVING A BACKUP VELOCITY MONITOR AND PROTECTION SYSTEM

[75] Inventors: Eimei M. Onaga, Brookfield Center; Richard J. Casler, Jr., Newton, both of Conn.

[73] Assignee: Unimation Inc., Danbury, Conn.

[21] Appl. No.: 932,842

[22] Filed: Nov. 20, 1986

[51] Int. Cl.[4] .................... G06F 15/46; G05B 9/02
[52] U.S. Cl. .................... 364/513; 318/563; 318/615; 364/174; 364/187; 901/9; 901/23; 901/20
[58] Field of Search .................... 364/513, 191–193, 364/184–187, 164, 165, 174, 150; 318/561, 568, 563–565, 615–618; 371/67, 71; 901/2–5, 20, 9, 23, 24, 41, 46; 414/730

[56] References Cited

U.S. PATENT DOCUMENTS

| | | |
|---|---|---|
| 4,159,444 | 6/1979 | Bartlett et al. .................... 318/564 |
| 4,362,978 | 12/1982 | Pollard et al. .................... 364/513 X |
| 4,506,321 | 3/1985 | Comstock et al. .................... 364/174 |
| 4,535,405 | 8/1985 | Hill et al. .................... 364/400 |
| 4,598,380 | 7/1986 | Holmes et al. .................... 364/513 |
| 4,603,284 | 7/1986 | Perzley .................... 364/513 |
| 4,623,971 | 11/1986 | Ailman et al. .................... 364/513 |
| 4,695,941 | 9/1987 | Kumar .................... 364/165 |

Primary Examiner—Joseph Ruggiero
Attorney, Agent, or Firm—J. L. Brzuszek

[57] ABSTRACT

A digital robot control includes a position/velocity microprocessor control and a torque microprocessor control for each of multiple robot axes. Digital position, velocity and motor current feedback signals are generated from motor sensor signals for use in making microprocessor control calculations. A backup velocity determination is made for each joint motor by the torque microprocessor from the motor current feedback, the motor command terminal voltage and the motor resistance and inductance. The robot is shut down if the difference between the feedback and backup velocity values exceeds a predetermined limit.

22 Claims, 16 Drawing Sheets

MULTIAXIS DIGITAL ROBOT CONTROL HAVING A BACKUP VELOCITY MONITOR AND PROTECTION SYSTEM

CROSS REFERENCE TO RELATED APPLICATIONS

The following concurrently filed patent applications are related to the disclosure of the present application, each filed on Nov. 20, 1986, assigned to the present assignee and are hereby incorporated by reference:

U.S. Ser. No. 932,975 entitled DIGITAL ROBOT CONTROL HAVING AN IMPROVED CURRENT SENSING SYSTEM FOR POWER AMPLIFIERS IN A DIGITAL ROBOT CONTROL and filed by Kenneth E. Daggett, Leonard C. Vercellotti, Richard A. Johnson, Richard J. Casler and Eimei Onaga.

U.S. Ser. No. 932,841 entitled DIGITAL ROBOT CONTROL HAVING AN IMPROVED PULSE WIDTH MODULATOR and filed by Kenneth E. Daggett.

U.S. Ser. No. 932,992, abandoned, entitled COMMUNICATION INTERFACE FOR MULTI-MIRCROPROCESSOR SERVO CONTROL IN A MULTIAXIS ROBOT CONTROL SYSTEM and filed by Kenneth E. Daggett.

U.S. Ser. No. 932,976, U.S. Pat. No. 4,763,055, entitled DIGITAL ROBOT CONTROL HAVING HIGH PERFORMANCE SERVO CONTROL SYSTEM and filed by Kenneth E. Daggett, Richard J. Casler and Eimei Onaga.

U.S. Ser. No. 932,974, abandoned, entitled DIGITAL ROBOT CONTROL PROVIDING PULSE WIDTH MODULATION FOR A BRUSHLESS DC DRIVE and filed by Kenneth E. Daggett, Richard A. Johnson, Eimei Onaga and Richard J. Casler.

U.S. Ser. No. 932,853, abandoned, entitled IMPROVED POSITION AND VELOCITY FEEDBACK SYSTEM FOR A DIGITAL ROBOT CONTROL and filed by Kenneth E. Daggett, Richard J. Casler and Eimei Onaga.

U.S. Ser. No. 932,982 entitled UNIVERSAL ROBOT CONTROL BOARD CONFIGURATION and filed by Richard J. Casler, Eimei Onaga, Vincent P. Jalbert, Barrett Booth, and Kenneth E. Daggett.

U.S. Ser. No. 932,991 entitled BASIC DIGITAL MULTIAXIS ROBOT CONTROL HAVING MODULAR PERFORMANCE EXPANSION CAPABILITY and filed by Kenneth E. Daggett, Barrett Booth, Eimei Onage and Richard J. Casler.

U.S. Ser. No. 932,989 entitled IMPROVED DIGITAL CONTROL FOR MULTIAXIS ROBOTS and filed by Kenneth E. Daggett, Richard J. Casler, Eimei Onaga, Barrett Booth, Rajan Penkar, Leonard C. Vercellotti and Richard A. Johnson.

U.S. Ser. No. 932,983 entitled MODULAR ROBOT CONTROL SYSTEM and filed by Kenneth E. Daggett, Barrett Booth, Vincent P. Jalbert, Eimei Onaga and Richard J. Casler.

U.S. Ser. No. 932,977, abandoned, entitled MULTIPROCESSOR TORQUE SERVO CONTROL FOR MULTIAXIS DIGITAL ROBOT CONTROL SYSTEM and filed by Kenneth E. Daggett, Richard J. Casler and Eimei Onaga.

U.S. Ser. No. 932,990, abandoned, entitled MULTIPROCESSOR POSITION/VELOCITY SERVO CONTROL FOR MULTIAXIS DIGITAL ROBOT CONTROL SYSTEM and filed by R. Lancraft, Eimei Onaga, Richard J. Casler, Kenneth E. Daggett and Barrett Booth.

U.S. Ser. No. 932,986 entitled MULTIAXIS ROBOT HAVING IMPROVED MOTION CONTROL THROUGH VARIABLE ACCELERATION/DECELERATION PROFILING and filed by Rajan Penkar.

U.S. Ser. No. 932,988 entitled MULTIAXIS ROBOT CONTROL HAVING CAPABILITY FOR EXECUTING TIMED MOVES and filed by Rajan Penkar.

U.S. Ser. No. 932,985 entitled MULTIAXIS ROBOT CONTROL HAVING IMPROVED CONTINUOUS PATH OPERATION and filed by Rajan Penkar.

U.S. Ser. No. 932,840 entitled MULTIAXIS ROBOT CONTROL HAVING FITTED CURVED PATH CONTROL and filed by Rajan Penkar.

U.S. Ser. No. 932,973, abandoned, entitled MULTIAXIS ROBOT CONTROL HAVING IMPROVED ENERGY MONITORING SYSTEM FOR PROTECTING ROBOTS AGAINST JOINT MOTOR OVERLOAD and filed by Eimei Onaga.

BACKGROUND OF THE INVENTION

The present invention relates to robots and more particularly to robot controls and velocity feedback systems for such controls.

The arm of an industrial robot is provided with a plurality of joints that are interconnected by links. Each joint is driven by a motor under the direction of the robot control. The robot tool tip is moved over commanded paths and/or to commanded positions through coordinated movement of the joints.

Robot controls normally have a control loop configuration that includes a velocity control for each joint motor. The velocity control loop employs joint motor velocity feedback typically generated by a tachometer or derived from position encoder output signals.

The operation of the robot arm is thus highly dependent on the validity of the velocity feedback. If the tachometer or encoder becomes defective or if velocity feedback otherwise becomes erroneous or lost, robot arm control is essentially lost and resultant arm motion could result in personal injury or property damage.

For safety and property protection reasons, it is thus desirable to provide a backup mechanism for monitoring the velocity feedback system in a robot control and providing protective action in the event a failure is detected. The referenced patent applications disclose a new completely digital robot control system in which velocity feedback control is employed. The present invention is directed to a backup velocity monitor and protection system embodied in that robot control.

SUMMARY OF THE INVENTION

A digital control is provided for a robot having a plurality of arm joints. An electric motor drives each of the robot arm joints and a power amplifier operates to supply drive current to each motor.

Each joint motor has digital feedback control loop means operable at a predetermined sampling rate and including digital position and velocity control loops driving a digital torque control loop in accordance with digital position commands to generate digital motor voltage commands for controlling the associated power amplifier.

Means are provided for sensing the motion of each joint motor and for generating corresponding digital position and primary velocity feedback signals for control calculations in the position and velocity control loops. Means are also provided for generating digital signals representative of the respective joint motor drive currents for control calculations in the torque control loop.

Backup velocity monitoring means independently determines the velocity of each joint motor from the motor current and terminal voltage and the motor inductance and resistance. Comparisons are made between the primary and backup velocity signals for each joint motor.

BRIEF DESCRIPTION OF THE DRAWINGS

FIGS. 7A1-7A2, 8A1-8A2 and 9 show respective block diagrams for servo control, torque processor and arm interface boards employed in the system of FIG. 5.

DESCRIPTION OF THE PREFERRED EMBODIMENT

Robots—Generally

Robot capabilities generally range from simple repetitive point-to-point motions to complex motions that are computer controlled and sequenced as part of an integrated manufacturing system. In factory applications, robots can perform a wide variety of tasks in various manufacturing applications including: die casting, spot welding, arc welding, investment casting, forging, press working, spray painting, plastic molding, machine tool loading, heat treatment, metal deburring, palletizing, brick manufacturing, glass manufacturing, etc. For more complete consideration of robots and their uses, reference is made to a book entitled "Robotics in Practice" published in 1980 by Joseph F. Engelberger.

To perform work within its sphere of influence, a robot typically is provided with an arm, a wrist subassembly and an end effector. The coordinate system employed for the robot arm typically is Cartesian, cylindrical, polar or revolute. Generally, three motion axes are employed to deliver the wrist subassembly anywhere within the sphere of influence and three additional motion axes are employed for universal orientation of the end effector. A drive system is used for each motion axis, and it may be electrical, hydraulic or pneumatic.

PUMA Robot

Figure 1:
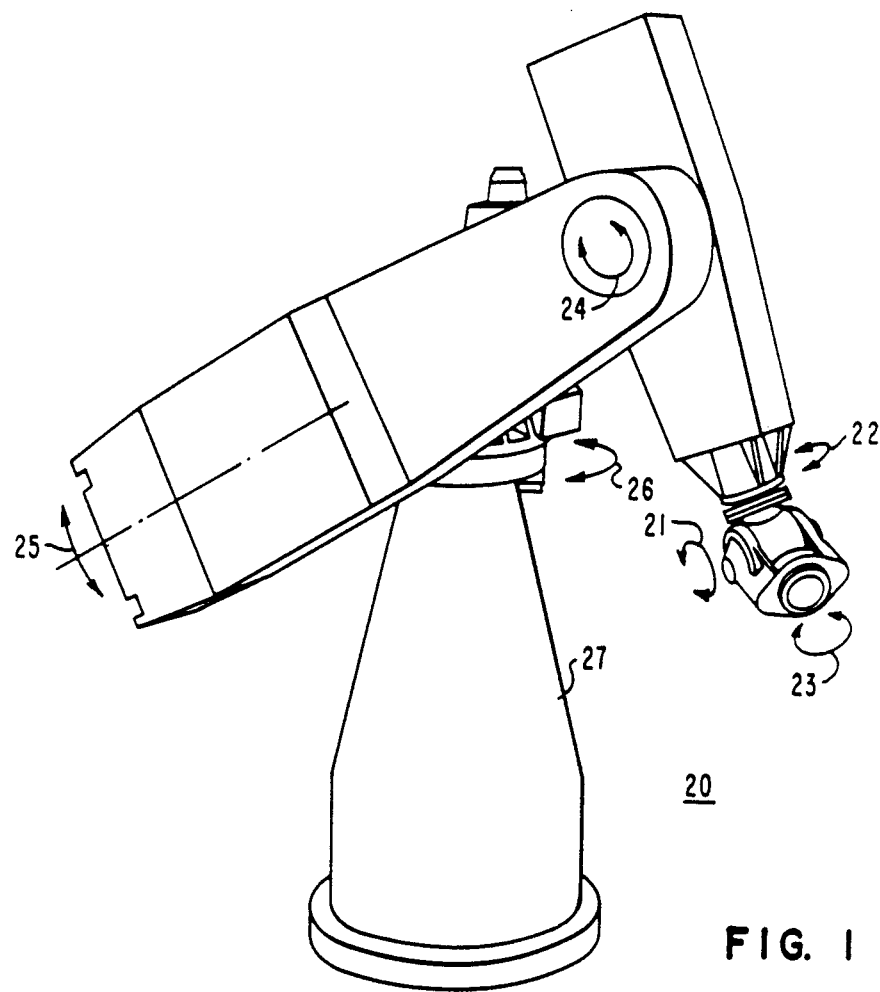
FIG. 1 shows a perspective view of a robot which is operated with more advanced and more accurate performance when controlled by a system making use of the invention.

More particularly, there is shown in FIG. 1 a six-axis industrial electric robot 20 which is illustrative of a wide variety of robots that can be operated in accordance with the principles of the invention. The robot 20 is a relatively powerful electric robot sold by Unimation Company, a wholly-owned company of the present assignee, under the trade name UNIMATE PUMA SERIES 700. The model 761 PUMA has a 22 pound payload capacity and a reach of 59.1 inches. The Model 762 PUMA has a 44 pound payload capacity and a reach of 49.2 inches.

PUMA 700 Series robots are designed with flexibility and durability to ensure long life and optimum performance in even the harshest, most demanding manufacturing environments. Specific customer needs for either higher payload or extended reach determine which model is suitable for a particular task.

With its longer reach, the PUMA 761 is ideally suited for precise, repetitive tasks such as arc welding and sealant dispensing. The PUMA 762 performs high-precision material handling, machine loading, inspection, testing, joining and assembly in medium and heavier weight applications. The PUMA robots occupy minimal floor space, yet a large work envelope allows the robots to service multiple machines and work surfaces.

Each axis motion is generated by a brush type DC electric motor, with axis position feedback generated by incremental encoders. As shown, the wrist is provided with three articulations, i.e., an up/down rotation indicated by arrow 21 and a left/right rotation indicated by arrow 22 and a third motion indicated by arrow 23. Elbow and shoulder rotations in the up/down direction are respectively indicated by arrows 24 and 25. Finally, a left/right arm rotation on a base 27 is indicated by arrow 26.

Robot Control

The present invention is directed to a robot control 30 (FIGS. 2, 3, or 4) which can operate the robot 20 of FIG. 1 and other robots including the larger Unimation 860 robot which employs brushless DC axis motors and absolute position feedback. Generally, however, the robot control 30 is universally and flexibly applicable to differing kinds and sizes of robots in stand alone or robotic network operation.

As a result of its universality, the control 30 can be arranged to operate a complete family of robots. Thus, all hydraulically and electrically driven robot arms manufactured by Unimation, a company of Westinghouse, assignee of the present invention, can be operated by the control 30. The key to the family usage, or more generally the universality of the control 30 lies in modularization and in minimizing the use of arm dependent hardware and avoiding the use of any arm dependent hardware in as much of the modular control structure as possible. The robot control 30 is identified by the acronym UNIVAL and operates with completely digital servo control to provide better robot performance with lower cost.

Control Loops

Figure 2:
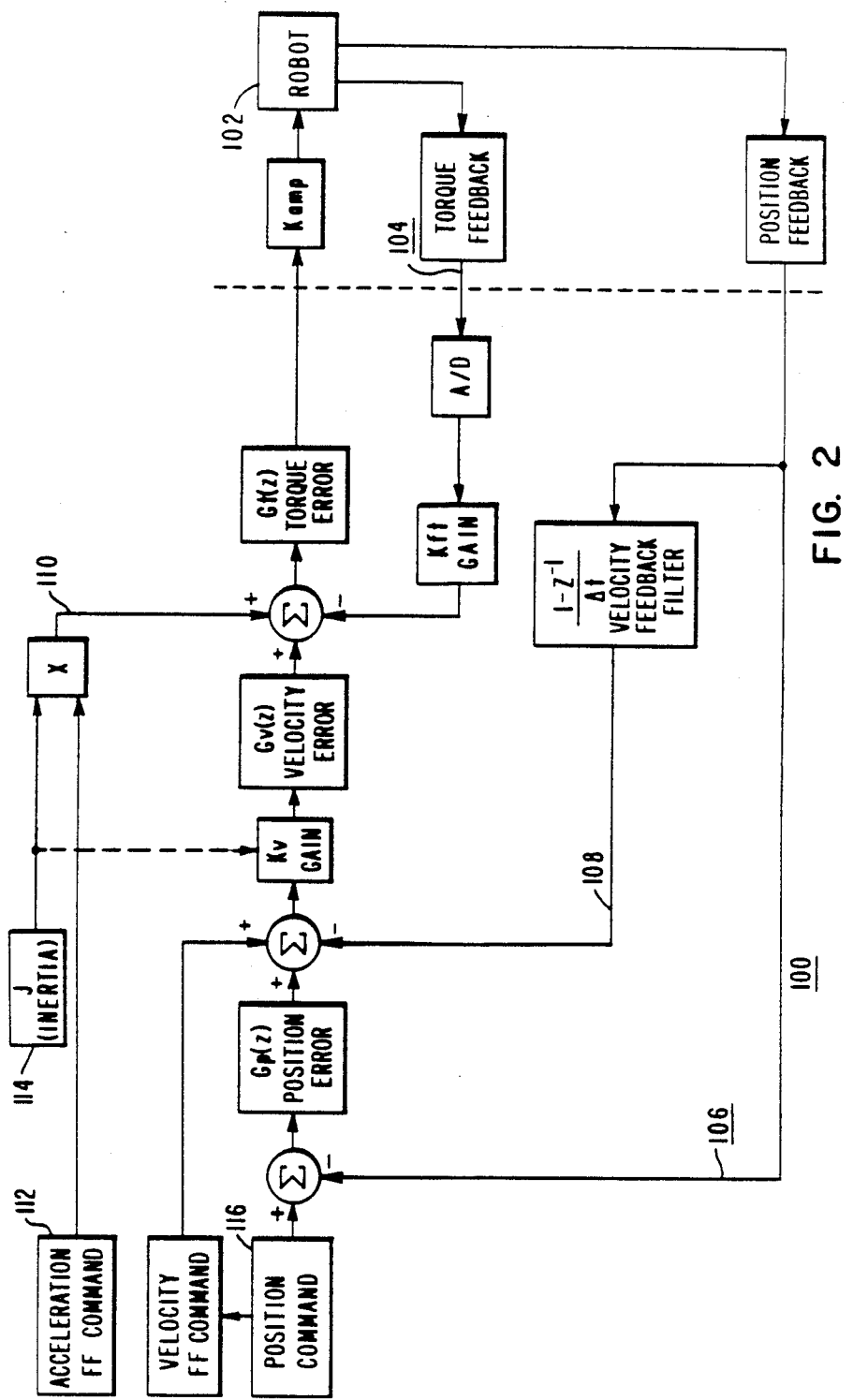
FIG. 2 shows a generalized block diagram of a control loop arrangement employing position, velocity and torque control loops in which the invention may be embodied.

In FIG. 2, there is shown an embodiment of a generalized control loop configuration 100 employable in the UNIVAL ™ robot control. Thus, each robot arm joint motor 102 is operated by a torque control loop 104. An outer position control loop 106 is tandem connected to a velocity control loop 108 which in turn drives the torque control loop 104. A feedforward acceleration control loop 110 is responsive to acceleration command 112 and arm and load inertia 114 is also directly coupled to the input of the torque control loop 104. The robot arm is operated by the control loop 100 in accordance with a robot program through a stream of program position commands 116 applied to the position control loop.

Figure 3:
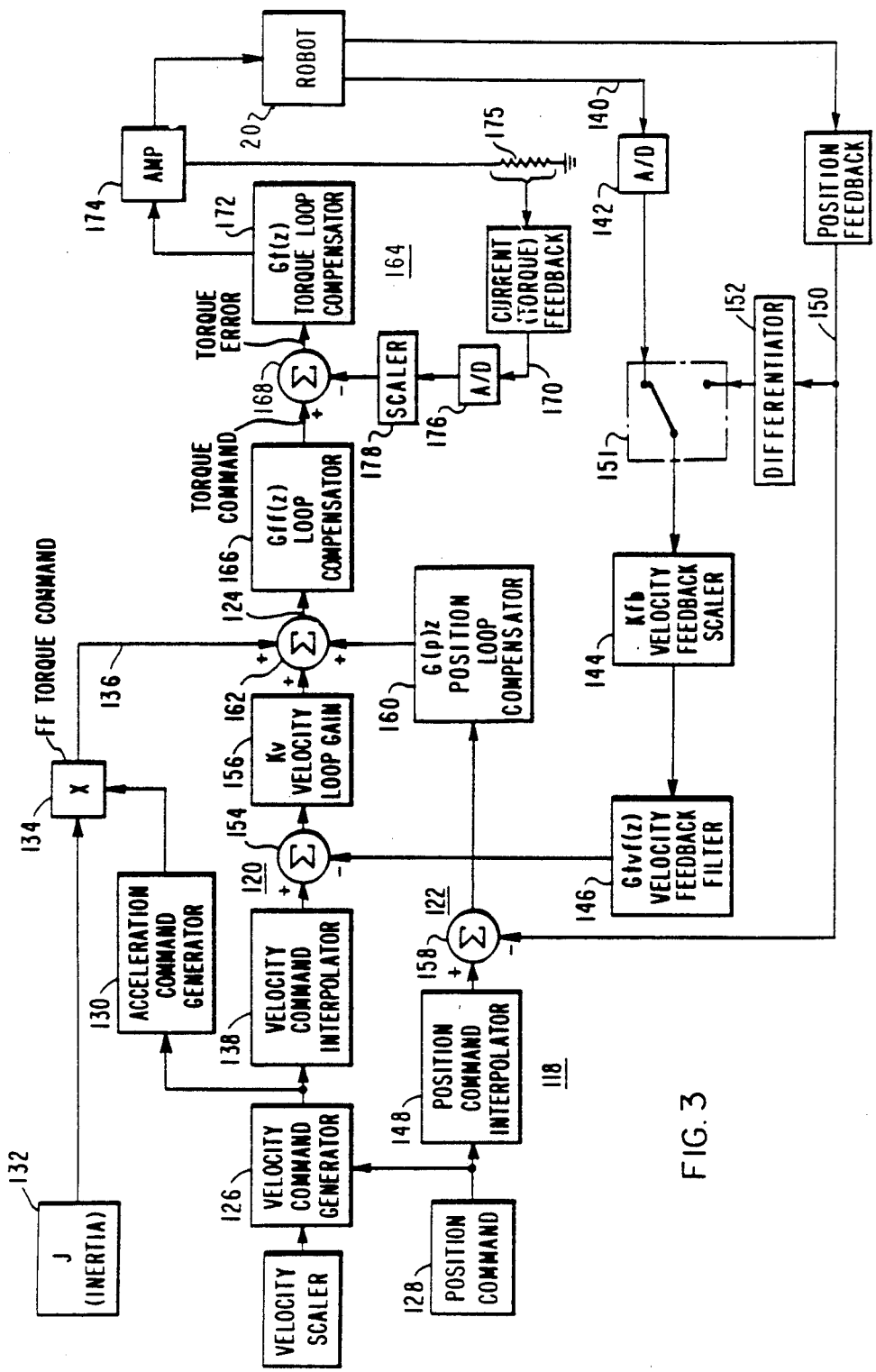
FIG. 3 shows a more detailed block diagram of a control loop arrangement employing position, velocity and torque control loops in which the invention preferably is embodied.

FIG. 3 shows the preferred generalized control loop configuration 118 presently employed in the UNIVAL ™ robot control. It is preferably implemented as a completely digital control. With the provision of hierarchical architecture and multiprocessor architecture and floating point hardware as described herein or in other patent applications referenced above, the trajectory cycle can be characterized with a cycle time in the range of 32 to 8 milliseconds depending on the employed modular configuration.

In the preferred control loop arrangement 118, position control loops 122 and velocity control loop 120 are parallel fed to the input of a torque control loop 124. Velocity commands are generated by block 126 from position commands received by block 128. In turn, feedforward acceleration commands are generated by block 130 from the velocity commands. Computed inertia (load and arm) 132 is multiplied against the acceleration command as indicated by reference character 134 in the feedforward acceleration control loop 136.

In the velocity loop 120, the velocity command in the present embodiment is generated once every 8 to 32 milliseconds depending on the modular configuration of the robot control. The basic robot control described subsequently herein has a trajectory cycle time of 32 milliseconds while the enhanced contact has a trajectory cycle of 8 milliseconds.

In any case, a velocity command generator 126 interpolates velocity commands at the rate of 1 each millisecond which corresponds with the velocity feedback sampling rate in velocity feedback path 140. As shown, velocity feedback for a Unimation 860 robot is produced by tachometer signals which are converted from analog to digital by converter 142. A scaler 144 and a filter 146 supplement the velocity feedback circuitry.

Similarly, in the position control loop 122, an interpolator 148 generates position commands every millisecond in correspondence with the position feedback sampling rate in feedback path 150. In the Unimation 860 robot control, position feedback is absolute and the velocity and position feedback paths 140 and 150 operate as just described (with switch 151 as shown). For Unimation PUMA robots, tachometers are not available and velocity feefback is computed from incremental position feedback as indicated by block 152 (with the switch 151 swinging to its other position) as described more fully in referenced applications Ser. Nos. 932,841 and 932,853.

Velocity error is generated by summer 154 with gain applied by loop 156. Similarly, position error is generated by summer 158 with gain applied by box 160.

Velocity and position errors and feedforward acceleration command are summed in summer 162. Gain is applied in box 166 to generate a torque command which is applied to the input of torque control loop 164 every millisecond. Torque error is generated in summer 168 by summing the torque command (motor current command) with current feedback from feedback path 170. Box 172 applies a torque loop gain to the torque error (motor voltage commands) and pulse with modulated (PWM) output signals are applied to a power amplifier 174 which supplies the motor drive current for robot joint operation. Current feedback from resistor 175 is sampled every 250 microseconds (see referenced patent application Ser. No. 932,975 and converted to digital signals by box 176 with scaling applied by box 178.

Overview—Electronic Boards

Figure 4:
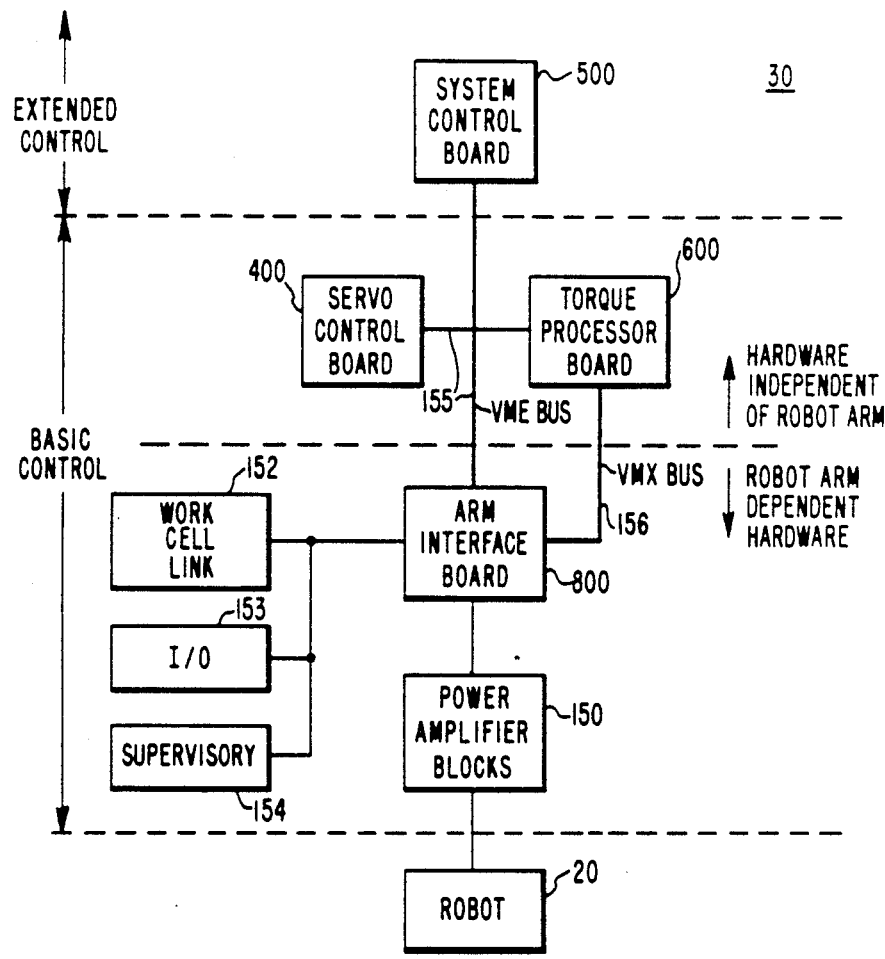
FIG. 4 shows an overview of an arrangement of electronic boards on which circuitry is arranged to implement the robot control and its velocity backup including the monitor in accordance with the present invention.

Implementation of the control looping for the robot control 30 in FIG. 4 achieved by the use of digital control circuitry disposed on a plurality of electronic boards. The organization of the circuitry on the boards and the partitioning of programming among various microprocessors enables advanced robot control performance to be achieved with a modular control configuration characterized with economy of manufacture, facilitates variability of configuration which enables universality of use, and flexibility in choice of level of control performance.

As shown in FIG. 4, the control board configuaration includes an arm interface board 800 which preferably houses all circuitry dependent on the type of robot arm being controlled. For example, position feedback circuitry will differ according to whether absolute or incremental position feeback is used by the robot arm to be controlled. Thus, two or possibly more varieties of the arm interface board 800 can be employed to provide digital control systems for any of a variety of different sizes or types of robot arms. Any particular robot arm would require use of the arm interface board which is structured to work with that robot arm.

The arm interface (AIF) board 800 also houses generic circuitry such as VME bus control circuitry which is generally related to two or more boards and not to any one board in particular.

Control signals (pulse width modulated) are generated from the AIF board 800 to control power amplifier blocks 150 which supply motor currents to the robot joint motors. The AIF board 800 also operates as a channel for external coupling of the robot control 30 to other robot controls in a work cell as indicated by the reference character 152, to programmable controllers and other input/output devices 153 in an area network and to higher level computers 154 for supervisory control.

A torque processor (TP) board 600 and a servo control board 400 are generic circuit boards used with the AIF board 800 and power amplifier blocks 150 in all robot control systems for all robot types. The three circuit boards 400, 600 and 800 provide complete 6 axis control for a robot arm and thus form a basic control configuration for the UNIVAL family of robot controls as well as other robot controls.

The torque processor board 600 provides motor torque control in response to commands from the servo control board 400. In turn, the servo control board 400 provides arm solutions and position and velocity control in accordance with a robot control program.

Extended control capability and/or system functioning is achieved by interconnecting additional electronic boards or devices to the basic control 400, 600, 800. For example, with the addition of a system control board 500 and partitioning of predetermined program functions including the arm solutions from the servo control board 400 to the system control board 500, the UNIVAL control can operate the robot 20 and other robots with significantly faster control action, i.e., with a trajectory cycle shortened from thirty-two milliseconds to eight milliseconds.

Interboard data communications for control and other purposes occur over multiple signal paths in a VME bus 155. Additionally, a VMX bus 156 is provided for connection between the torque processor board 600 and the AIF board 800.

Multiple pin interconnectors (not shown in FIG. 4) are provided on the AIF, TP and SCM boards and any other connectable units to facilitate VME and VMX interboard bus connections modular and board assembly for the robot control 30. Other connectors are provided on the AIF board 800 for external input/output connections.

More detail on the board circuit structure is presented herein or elsewhere in the writeups for the cross-referenced patent applications.

Velocity Monitoring and Protection System

Figure 5:
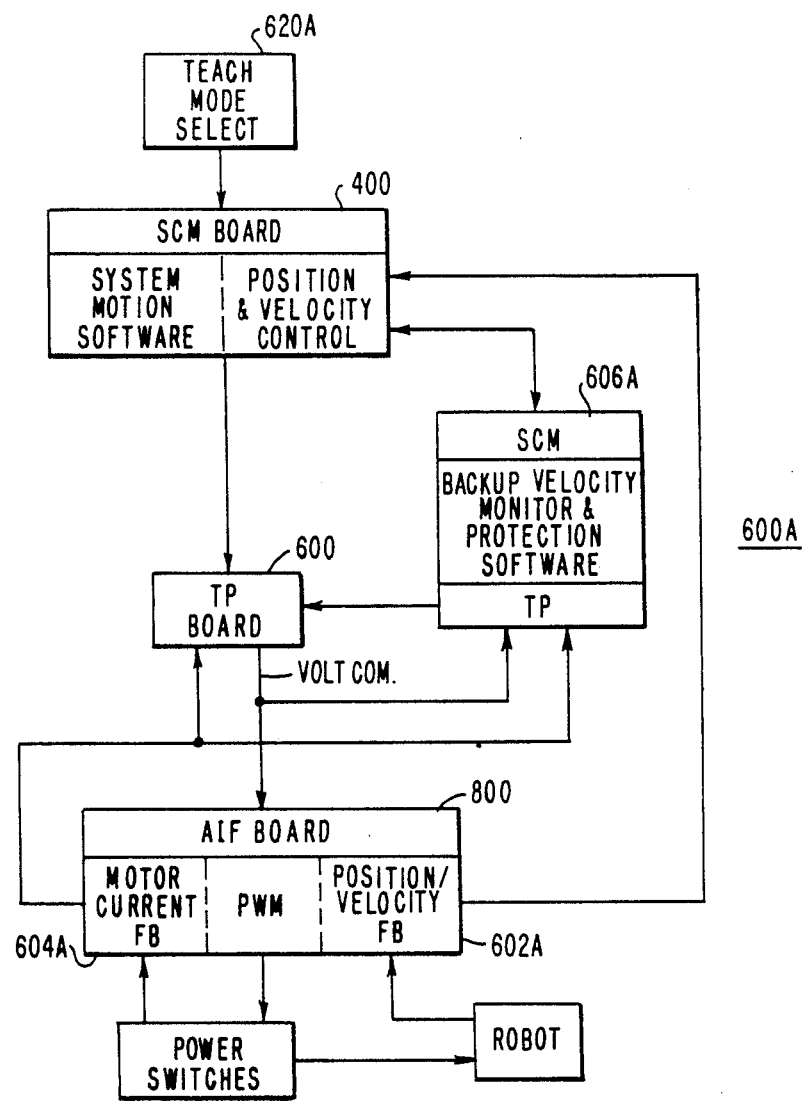
FIG. 5 shows a block diagram of a robot protection system that embodies a backup velocity monitor in accordance with the invention.

As shown in FIG. 5, the robot control includes a velocity monitoring and protection system 600A which provides a backup check on velocity control operation and, for safety and property protection reasons, initiates safeguarding action if a failure occurs. The backup velocity system 600A is centered about the torque processor (TP) board 600.

At the next higher control level, the SCM board 400 employs system motion software to develop position commands for each robot axis. With the use of these two core boards and the AIF board, the robot control is in its basic control configuration.

Position and velocity control circuitry on the SCM board 400 operate on the position commands to generate torque commands for the torque control on the TP board 600. In turn, the TP board 600 generates voltage commands for each joint motor.

The voltage commands are applied to a pulse width modulator (PWM) on the AIF board 800. The PWM in turn operates the power switches for the various joint motors to move the joints coordinately so that the robot tool tip goes to the commanded positions.

Position/velocity feedback 602A is coupled from the robot to the AIF board 800. In the case of UNIMATION 860 robots, the velocity feedback is in the form of a tachometer signals. For UNIMATION PUMA robots, the feedback is in the form of position encoder signals that are processed by circuitry on the AIF board 800 to produce velocity feedback signals.

Motor current feedback is sensed in the power switch circuitry (reference is made to incorporated by reference Ser. No. 932,975 for more detailed disclosure on current feedback) and coupled to the AIF board 800 as indicated by the reference character 604A.

Backup velocity monitor software 606A is employed to compute accurately an estimate of the actual velocity of each joint motor on the basis of the motor back-emf, i.e., from the motor terminal voltage, the known motor resistance and inductance, and the sensed motor current. The resultant computed velocity is thus determined independently of the tachometer or encoder sensed velocity and serves as a backup velocity check.

The velocity monitor software 606A is partitioned in this case between microprocessors on the SCM board 400 and the TP board 600. Thus, the back-emf velocity calculation is made on the TP board 600 and processing of the velocity calculation for checking and protective action is performed on the SCM board 400.

As shown, actual motor current feedback is derived from the AIF board 800. Voltage commands from the TP board 600 are employed as the motor terminal voltages in the software calculations.

Backup Velocity Monitor and Protection Software

Figure 6:
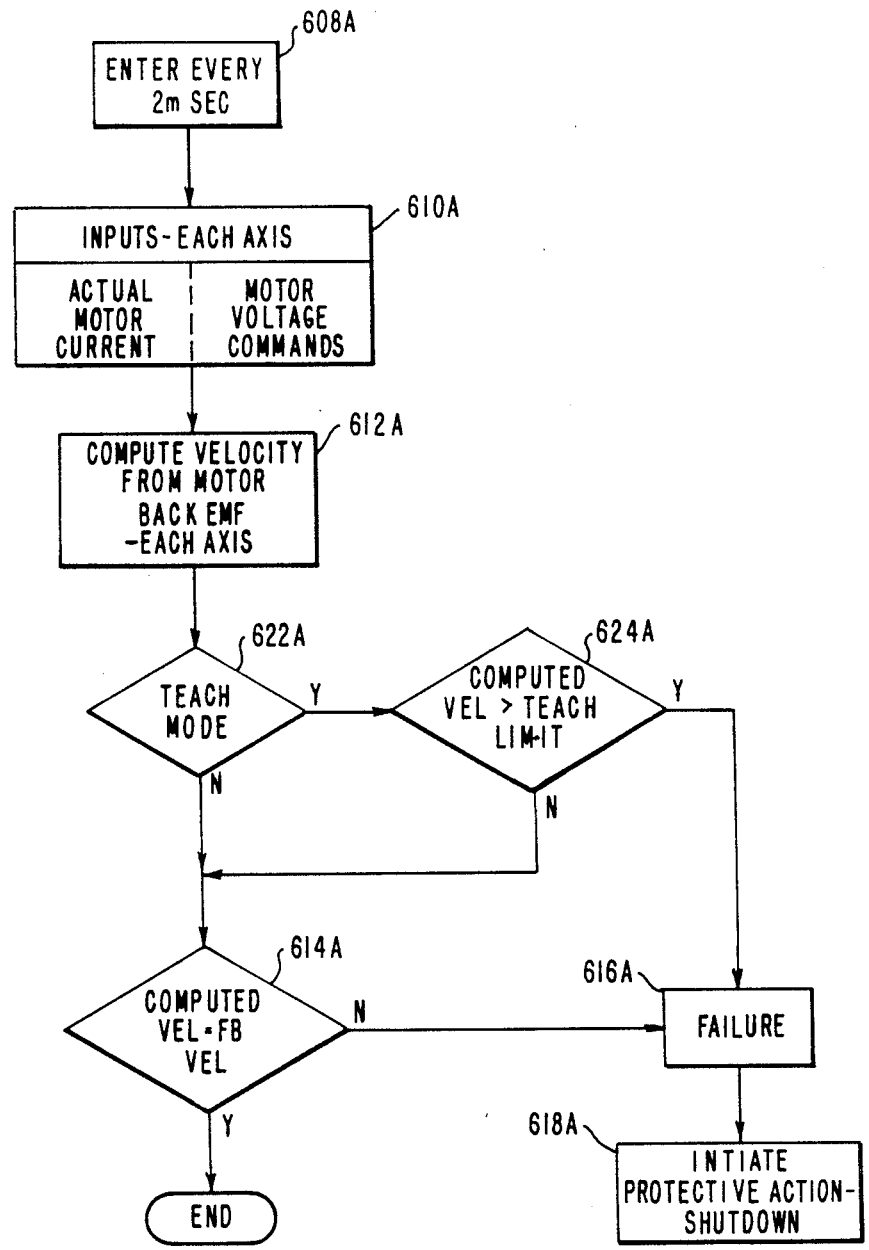
FIG. 6 shows a flow chart that represents the programmed operation of the velocity monitor and protection system.

The velocity monitor and protection programming is shown in a flow chart in FIG. 6. Thus, a velocity calculation routine is executed every 2 milliseconds as indicated by the reference character 608A. Inputs needed for the back-emf velocity calculation are obtained in block 610A and the velocity is calculated for each joint motor in box 612A. The feedback motor currrent and voltage command values employed in the calculation are average values for the preceding two milliseconds.

The following formula is employed in the calculation:

$$VEL = w^*Ke = Vin - (L^*di/dt + iR)$$

where:
R = motor resistance [ohm]
L = motor inductance [H]
Vin = motor terminal voltage [V]
Ke = motor Back-emf constant [V/rad/sec]
w = motor velocity [rad/sec]
i = motor current [A]
Algorithm:

$$VEL(n) = [PWMout^*2^{**}9 - MOTL^*i(n) - i(n-1) - i(n)^*MOTR]/2^{**}16$$

where:
i(n) is A/D value shifted right 6 bits and accumulated 1 msec/Ts times (running 1 msec average).
Ts is PWM sample rate = 250 micro sec
Scaling of L, R:
(i) equations:

$$MOTR = 2^{**}13^*Imax/Vmax^*R(ohm)$$

$$MOTL = 2^{**}13^*Imax/Vmax^*1/delt^*(H)$$

$$SV = 2^{**} - 8^*Vmax$$

where $Krpm = (SV/KE)^*VEL$
(ii) example:
Vmax = 300 V, Imax = 20 A, R = 0.49 ohm, L = 5.5 mh,
Ke = 120 V/Krpm, delt = 4 msec
MOTR = 268, MOTL 751
$Krpm = 9.76^*10^{**} - 3^*VEL$

| Vin | PWMout | VEL | VELemf |
|---|---|---|---|
| V | bits | bits | bits |
| Kpwm | $2^{}-9$ | $2^{}-16^*SV$ | 1/KE |
| A | | Iin | |
| Kad $2^{*}2-6$) | MOTR | Kpwm = Vmax/$2^{}15$ | |
| | MOTL | Kad = $2^{**}15$/Imax | |

At this point, the calculated velocity is transferred to the SCM board 400 where a microprocessor called the servo 402 executes block 614A to compare the back-emf computed velocity with the feedback velocity 602A. If a difference exists and if the difference exceeds a predetermined tolerance value, block 616A registers a failure and block 618A inititates protective action, i.e., robot shutdown.

In the special use case where the robot is being operated in the teach mode as a result of an operator selection through selector 620A (FIG. 5), a special low velocity limit is applied to the velocity controller to provide extra safety. In that event, software board 622A detects the teach mode and block 624A compares the back-emf computed velocity to the teach mode velocity limit and if it exceeds that limit, block 616A registers a failure and block 618A initiates protective shutdown action. If the computed velocity is within the teach mode limit, program execution proceeds to the block 614A for velocity feedback monitoring as previously described.

FURTHER DESCRIPTION OF BOARD IMPLEMENTATION CIRCUITRY SERVO CONTROL BOARD

A servo control module (SCM) or board 400 (FIGS. 4 and 7A1-7A2) is structured in accordance with the modular architecture of the robot control system to operate as a core board for a complete basic robot control and generate arm solutions from stored robot program commands or to operate as part of an expanded robot control and receive for implementation arm solutions produced from robot program commands by the higher level system control board 500. The generation of arm solutions involves the execution of robot control functions including robot program language interpretation, path planning, trajectory calculations (intermediate position commands and axis coordination) and transformation of position information between Cartesian and robot joint and robot tool coordinate systems. The SCM board 400 additionally provides communications interfacing with related peripherals and a host controller if provided.

The SCM board 400 is provided with program controlled digital circuitry to implement arm motion control loops for the robot control system. Motion control is achieved for each axis through a control loop arrangement which preferably includes interrelated position, velocity, and acceleration control loops from which torque commands are developed for implementation by the torque processor module 600. The digital servo control is a coordinated multiprocessor servo control that generates output torque commands from (1) position and velocity commands provided for each axis by the arm solution and (2) position and velocity feedback signals obtained from the position encoders and the tachometers through the arm interface module 800.

In the SCM control loop operation, a position error is calculated for each axis from the applied axis position command and the axis position feedback. A velocity error is calculated for each axis from a velocity command derived from successive position commands and from the axis velocity feedback. Preferably, the position and velocity control loops are operated in parallel, i.e., the position and velocity errors are summed to produce a torque command for the torque control loop on the torque control module 600. Additionally, an acceleration command preferably is derived from successive velocity commands and applied in a feedforward acceleration control loop which generates an acceleration based torque command for summation with the position and velocity errors in generating the SCM output torque command.

The frequency with which loop calculations are made is selected to produce robot arm motion which is fast, accurate, smooth and stable. For example, the frequency employed can be such as to provide a trajectory cycle of 32 milliseconds as in the present case. If desired, a faster trajectory cycle, i.e., as short as 8 milliseconds, can be achieved.

SCM Digital Circuitry

Figures 1, 7A:
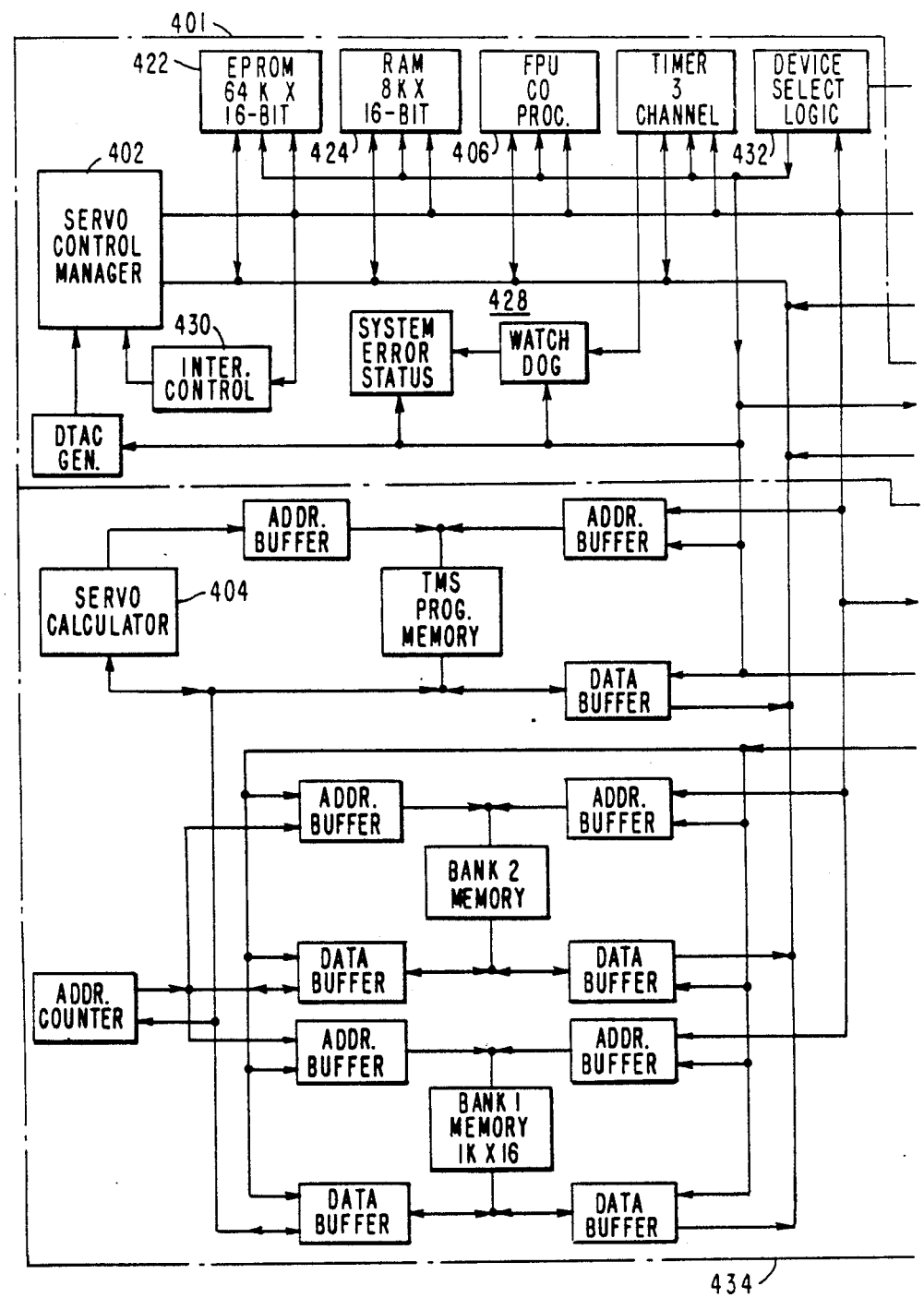
Figures 2, 7A:
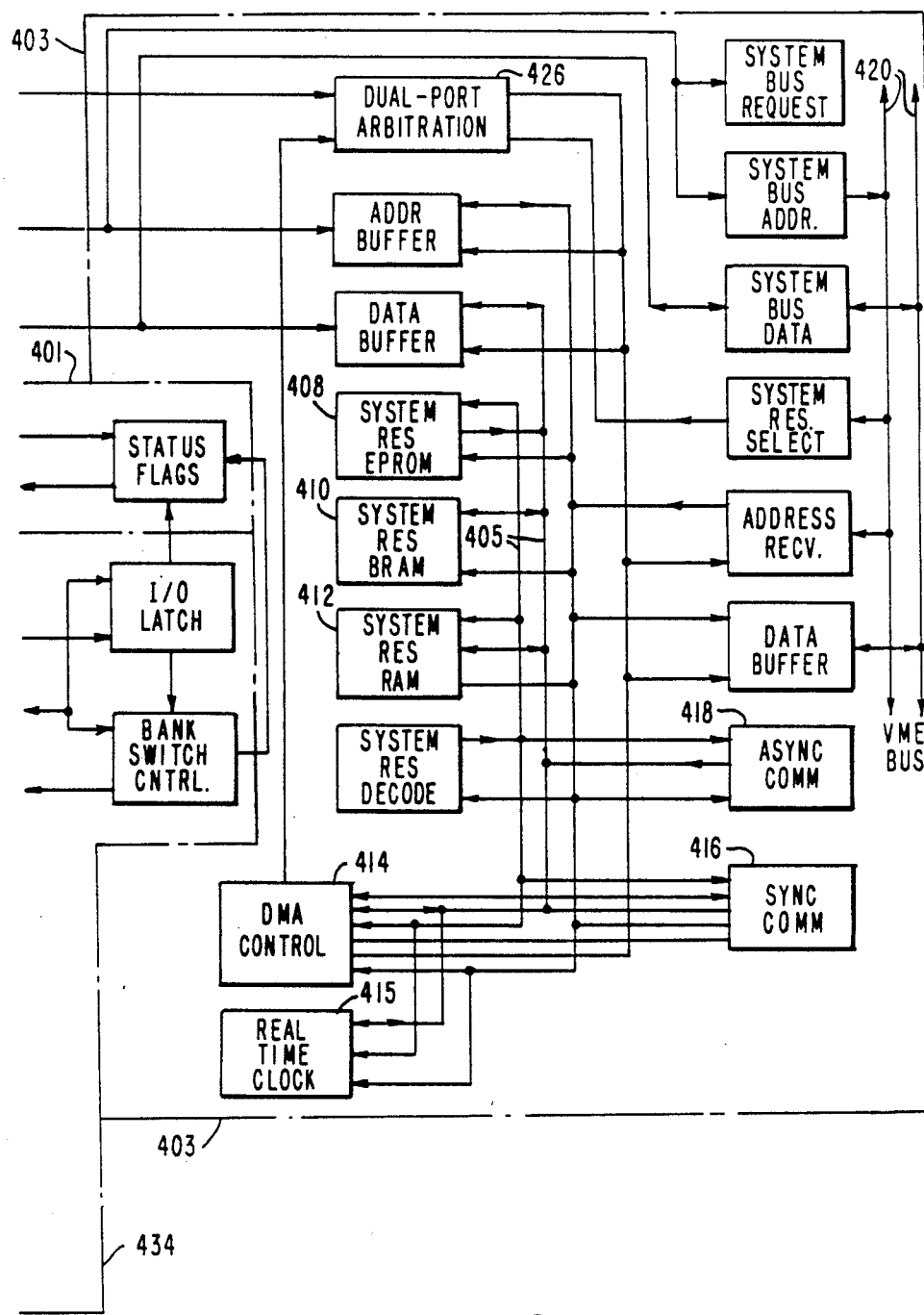

As observed in FIGS. 7A-1 and 7A-2, the SCM board 400 generally comprises two sections, i.e., a local processor section 401 and a system resource section 403. The system resource section 403 employs a bus 405 and provides functions related to the overall robot control system and not specifically related to execution of the position and velocity control loops.

These functions include EPROM 408 for storage of the robot arm solutions, battery backed-up RAM 410 for storage of non-volatile data, static RAM 412, real-time clock 415, a DMA controller 414 and two multi-protocol, dual channel communications controllers 416 and 418.

The system resource area is implemented as dual-port memory. As such, equal access to the system resource section is provided from either a local processor 401 or from the VME bus 420. The system resource functions appear as a bus slave to the VME bus. This provides the capability for these related functions to be controlled either from the SCM local processor, or from an optional processor connected to the system bus.

In the local processor section 401, the SCM digital circuitry includes coordinated digital coprocessors and interface and resource circuitry needed for specified performance, i.e., to provide control calculations and control data management needed for accurate and efficient control of all axes and to provide interfacing communication with a host controller, peripheral devices and other robot controllers. Preferably, a servo control manager 402 operates with a servo calculator 404 which functions as a slave processor principally to make position and velocity control loop calculations (i.e., feedback filters, loop gains, position and velocity errors, etc.).

The servo control manager 402 directs control, status and program data to and from the SCM board 400 and to and from the servo position/velocity control calculator 404. The servo control manager 402 can be a Motorola 68000 which has a high data processing capability. By separating data management and control calculation tasks in accordance with the respective capabilities of the processors 402 and 404, a basic circuit organization is provided as a basis for achieving substantially improved control performance with manufacturing and user economy.

In the illustrated embodiment, implementation of the local processor section of the SCM board 400 is based on usage of a 68000 processor as the servo control manager 402 and two coprocessors. Both coprocessors serve as peripheral devices to the 68000. One of the coprocessors 406 (preferably National Semiconductor 32081), provides floating-point calculation capability when arm solutions are to be provided by the SCM board 400. The other coprocessor, or slave processor, is the position/velocity servo calculator 404 and is implemented with a Texas Instruments TMS-32010 Digital Signal Processor. The position/velocity processor provides high speed fixed point calculation capability.

The remaining functions which are a part of the local processor section include local memory, both EPROM 422 and RAM 424, a peripheral timer/counter device, interrupt control 430, and system error monitoring devices 428. The local processor 402 can serve as a master to the VME bus for access to the TPM or other related type functions. However, the SCM board 400 does not provide VME bus system controller type functions which normally include system reset generation, bus arbitration for access to the bus and system bus clock generation, since these functions are implemented on the arm interface board 800.

The SCM board 400 is arranged to provide as much systems flexibility as is reasonably possible, and to obtain the maximum performance from available large scale integrated (LSI) circuitry. This is one of the reasons that the DMA and communications facilities are implemented in the system resource area as opposed to being directly connected to the local processor bus. This architecture not only frees the servo control manager 400 from direct intervention in communications data movement, it also eliminates the local processor bus communications related overhead, thus allowing high speed serial communications to be conducted without significant impact on program execution time in the servo control manager 400. Also, by placing these functions in the system resource area, these facilities can be operated by any other optional processor with capability of serving as a VME bus master. This would then totally free the servo control manager 400 from communications related processing. This organization allows the complete functionality required for a robot control system to be implemented in a cost effective manner and on a minimal set of boards while also allowing increased performance controllers to be implemented without impacting the overall system design.

Another significant area is the interface between the servo control manager 402 and the servo calculator 404. Here, a special dual port memory organization, referred to as "ping-pong" or "bank switched" memory allows either processor to communicate with the other without impacting the processing performance of either processor.

Programmed Operation of Servo Control Board

As schematically shown in FIGS. 7B, 7C, 7D and 7E, the program system for the servo control data manager 402 of FIG. 7A-1 comprises a background program 450 called MAIN and a cyclically operated foreground interrupt routine 452 called SERVO. When the system is started as indicated to RESET, an initialization routine 453 is executed prior to continuous running of the MAIN program 450. In addition to the cyclically executed SERVO interrupt 452, an interrupt routine 454 called C&UNEX operates in the foreground on demand to process unscheduled or unexpected interrupts. Further, a special highest priority routine 457 called the watch dog timer interrupt functions in response to operation of the external watch dog hardware.

Where the robot control system includes the system control board 500 in FIG. 4 for higher performance through higher computing capacity, the MAIN program 450 provides for receiving and distributing position commands from the system control board 350. In the minimum or basic robot control system configuration, the system control board 500 is not included and the MAIN program 450 further performs arm solutions to generate position commands locally on the servo control board 400. Additional description on the minimum robot control is presented in Ser. No. 932,991.

Figure 7B:
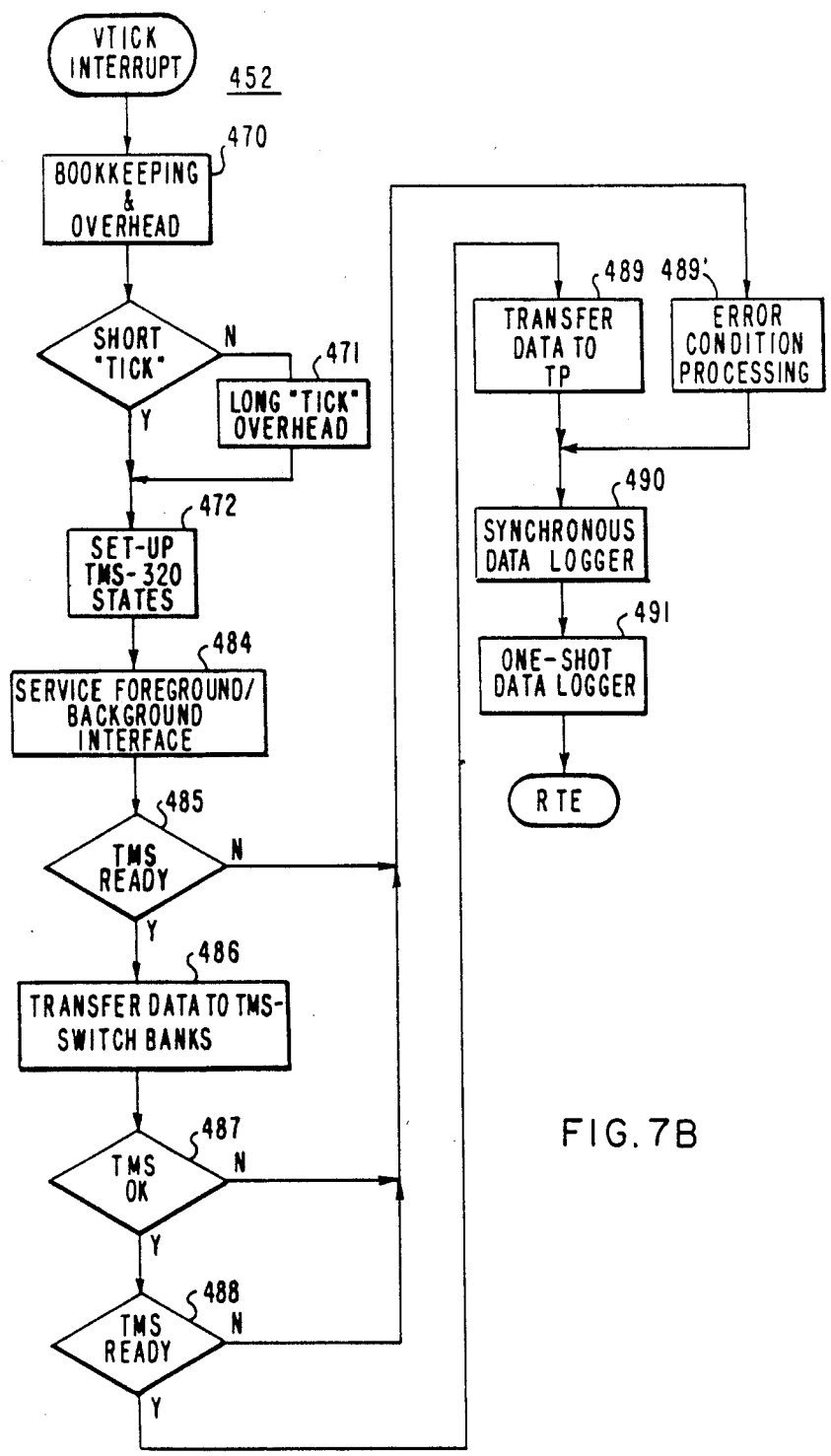
FIGS. 7B-7E show flow charts for servo control board programming.

The rate at which the MAIN program 450 is interrupted for the cyclical execution of the SERVO routine 452 is controlled by the signal VTICK generated once each millisecond on the VME bus 155 from the arm interface board 800. The basic functions provided by the SERVO routine 452 better shown in FIG. 7B are:

(1) transfer control data to and from the servo calculator 404;
(2) transfer control data to and from the torque processor board 600;
(3) receive sensor feedback data over the VME bus 155 from the arm interface board 800;
(4) interface 456 to the supporting background task RDMASC in FIG. 7E and in greater detail in FIG. 8F of Ser. No. 932,991;
(5) perform synchronous data logging;
(6) perform one shot data logging;
(7) place broadcast data in a blackboard storage area;
(8) shut the system down if serious error conditions occur.

Figures 7C, 7D, 7E:
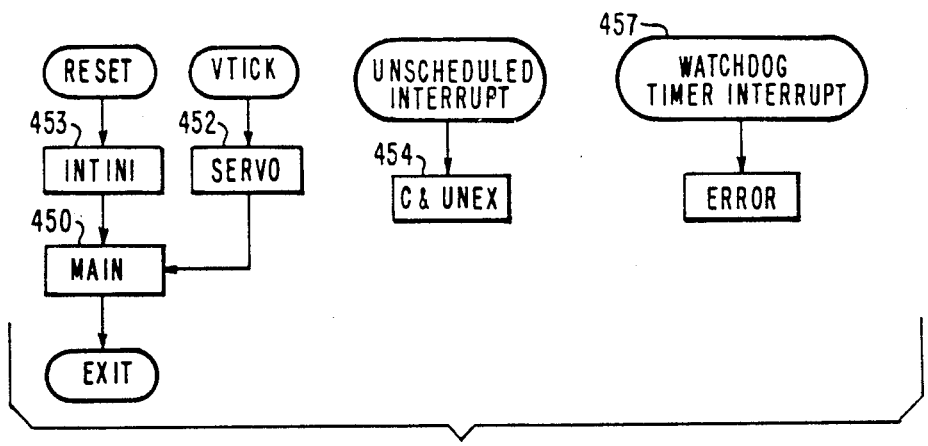
Figures 1, 8A:
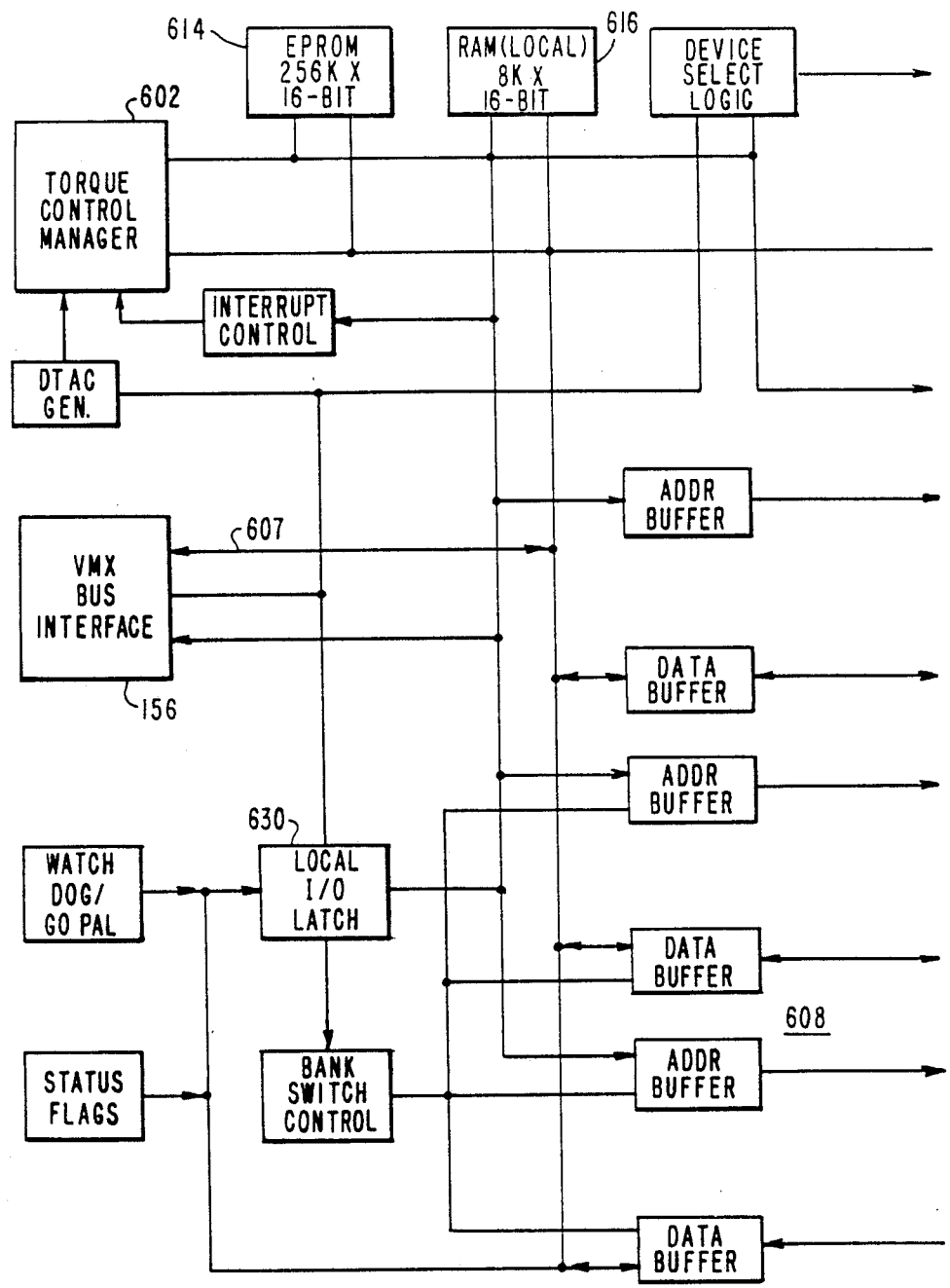
Figures 2, 8A:
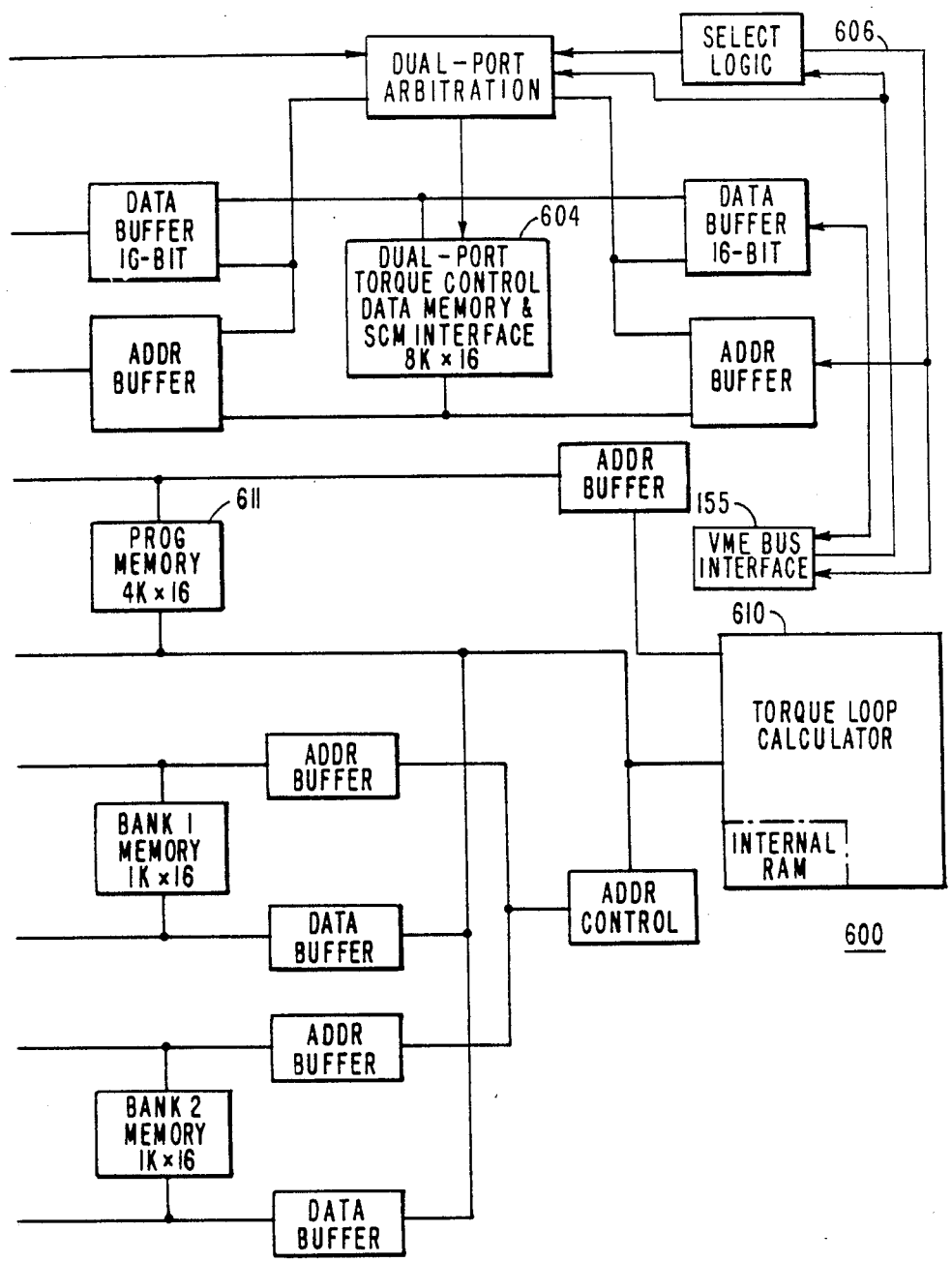

The initialization routine is shown in greater detail in FIG. 7C. The process essentially comprises the performance of a series of tasks as indicated by the successive blocks. The following list provides further information on the nature of these tasks:

| TASK | INITIALIZATION |
|---|---|
| INISRC | bit-bus emulator for handshake |
| INSCROM | feedback interface |
| INIFIX | global variables |
| INCONF | robot default configuration |
| INTMS | servo calculator-download program store |
| INIAIB | torque processor board 600 |
| INROB | robot software configuration |
| INJTMS | bank switch memory |
| INJONT | joint data structure via servo calculator program memory and torque processor board shared RAM reads |
| INBUF | internal buffer management areas |
| INIDLC | one shot and synchronous data logger interface |
| CRTINI | input/output hardware-servo control board 400 |
| BBINIT | bit-bus emulator interface and handshake with system control board 350 |

Once the system is initialized, the MAIN program 450 (FIG. 7D) begins continuous cyclical background execution. As shown in FIG. 7E, a routine 456 called RDMASC is run to provide ongoing reading of system position commands from the bit-bus emulator which is a designated memory area in shared RAM where system commands are deposited when received from the system control board 350.

Viewed as a whole, the background and interrupt routine can take on the following finite servo states:
0—Start-up state
1—Initializing state
2—Calibrating state
3—Servo disabled state
4—Servo enabled, hold state
5—Servo enabled, moving state The background task is responsible for assuring that valid state transitions occur, and for sequencing the interrupt task to new states. The interrupt task is therefore written to accept "commanded" states and to supply "current" states. In addition, the background task is sequenced via commands from the bit-bus emulator. The following state transition table defines this operation:

| Current State | Command ID from bit-bus | | | | | | | | | |
|---|---|---|---|---|---|---|---|---|---|---|
| | 36 | 17 | 45 | 1 | 16 | 34 | 20 | 2 | 18 | 46 |
| 1 | −1 | −1 | −1 | −1 | −1 | 2 | −1 | −1 | −1 | −1 |
| 2 | −1 | 3 | −1 | −1 | −1 | 2 | −1 | −1 | −1 | −1 |
| 3 | 3 | 3 | 3 | 4 | −1 | −1 | −1 | 3 | −1 | 3 |
| 4 | 4 | −1 | −1 | 3 | −1 | −1 | 5 | 4 | 4 | 4 |
| 5 | −1 | −1 | −1 | 3 | 4 | −1 | 5 | −1 | −1 | −1 |

Where a "−1" indicates an illegal state transition. The bit-bus commands are defined as follows:
36—Where command
17—Calibrate command
45—Install servo parameters command
1—Enable/disable servos command
16—Hold command
34—Initialize command
20—Normal motion command
2—Brake command
18—Limp command
46—Upload current servo parameters command Generally, a set of position commands is generated for the servo loops once each Valcycle, in this case once every 32 milliseconds. In turn, each Valcycle is measured by Vticks which are generated on the VME bus once every millisecond. There are thirty-two (32) Vticks in each VALCYCLE in this case.

A cycle counter named TCKCNTR counts the Vticks in each VALCYCLE. A running counter called UNICNTR keeps a summing count on Vticks up to $2^{31}$ ticks.

When the next previous VALCYCLE has been ended as indicated in FIG. 8F of Ser. No. 932,991 by the UNICNTR in block 457, block 458 operates on the beginning of the new VALCYCLE when TCKCNTR=1 to initiate reception of the new set of position commands for the new VALCYCLE. Thus, block 459 reads the new commands from the bit-bus emulator.

If the command includes an emergency command (such as disable servo), block 460 directs the emergency command to an emergency command buffer. Block 461 sends motion (position) commands to a motion command buffer. Similarly, block 462 sends the non-motion commands to a non-motion command buffer.

The blocks 460, 461 and 462 perform like basic functions. First, the command is read from the bit-bus emulator in shared RAM. Next, prescribed checks are made to validate the command. Finally, the command is routed to the designated buffer in local non-shared internal RAM.

If no direction is found to transfer a system command to an internal RAM buffer, block 463 records a no command error and prepares an alternate command (same as last command or a shutdown if this is the second occurrence of this no command error).

Next, blocks 464 and 465 send a response to the system control board 500 that the newest command has been received when the value of the tick counter nears the end of the current VALCYCLE, i.e., when it equals the VALCYC minus three. Block 466 next repeatedly polls UNICNTR until RDMASC is to be re-executed to receive the next system command.

When a VTICK occurs (i.e., once every millisecond), RDMASC is temporarily interrupted for execution of the SERVO routine 452. As shown in the flowchart in FIG. 7B, the SERVO routine 452 first performs needed bookkeeping and overhead tasks as indicated in block 470. For example, the watchdog timer is reset for the 2 millisecond interrupt. If the tick is a long tick, i.e., the tick counter equals one to mark the start of a new VALCYCLE, block 471 performs certain additional overhead tasks. The basic functions performed are: reset tick counter to 1; route the new position command from the system control board to the servo calculator; and process changes of state in the SERVO routine.

Loading Data for Switching to the Servo Calculator

Still considering FIG. 7B, if the tick is a short tick, i.e., an intermediate tick in the 32 tick cycle, or after long tick overhead has been performed, block 472 prepares for transferring data to the servo calculator by loading data to the bank switched memory according to the state in which the servo calculator 404 in FIG. 7A-1 is to be.

The flowchart in FIG. 8G of Ser. No. 932,991 shows the servo calculator setup in greater detail. If block 473 therein finds the calculator is to be in the start-up state, block 474 fetches data needed for start-up logic for downloading to the servo calculator 404. For the initialization state, blocks 475 and 476 fetch initialization command data for downloading to the servo calculator 404. Similarly, calibration command data is readied for the servo calculator 404 by blocks 477 and 478 for the calculator calibration state.

If the calculator is to be disabled, blocks 479 and 480 load into the bank switched memory a disabled command. Finally, if the calculator state is to be hold or moving, which covers most of the operating line, blocks 481 and 482 load motion command data into the bank switched memory. If none of the listed states are detected, block 483 records an error.

Data Flow and Timing

In the HOLD/MOTION state, control data generally flows as follows as seen in an overview FIG. 8A-2 again present in Ser. No. 932,991. Once every VALCYCLE, i.e., once every 32 milliseconds in this case, position command data for all axes is received by the servo contorol board main program from the system control board and shuttled through the bank switch memory to the servo calculator. Feedback data (position and velocity) is generated for each axis every millisecond and it is transferred to the servo calculator through the bank switched memory every millisecond by the servo control data manager through operation of the servo interrupt routine.

The servo calculator computes a torque command every millisecond for each axis from the command and feedback data. In turn, the torque commands are transferred every millisecond by the servo control data manager from the bank switched memory to the torque processor board. On the TP board, torque calculations based on torque commands and current feedback are performed to generate motor voltage commands for all axes every 250 microseconds.

Switching Data to the Servo Calculator

After completion of the setup subroutine 472, block 484 in FIG. 7B performs whatever data transfer service is needed for the foreground/background interface within the servo control data manager 402.

In the servo calculator 404, two basic functions are performed. First, downloaded position command data is interpolated for each of the 31 ticks between long ticks in the VALCYCLE, and velocity and acceleration command data are computed from the position command data for each tick. Next, servo calculations are made for each axis after each tick for the position, velocity and acceleration commands then applicable and the concurrently received position and velocity feedback. As a result, a torque command is computed for each axis after every tick for execution by the torque processor board.

The control algorithms executed by the servo calculator are described in greater detail in Ser. No. 932,990.

Torque Processor Board Concepts

The torque processor (TP) board 600 provides a functional interface to the robot joint drive motors. Functionally, the TP board 600 implements the lowest level of control in the hierarchical control system, providing closed loop servo torque control for six robot axes. Physically, the TP board 600 electrically interfaces the robot path planning control system and the servo control (SCM) board with the arm interface (AIF) board 800, which in turn interfaces to the robot joint drive motors. The primary function of the TP board 600 is to regulate robot joint motor currents to commanded values by generating motor winding voltage commands which are executed using a pulse width modulation scheme on the AIF board.

The TP board 600 interfaces at one level to the SCM board, accepts from the SCM board torque commands and servo parameters for six axes and returns status data. The TP board 600 interfaces at a second lower level to the AIF board 800 providing servo voltage commands for the six robot axes. The AIF board 800 receives drive motor current, position and velocity feedback for closed loop control on the SCM and TP boards.

The TP board 600 employs the paired microprocessor to provide a number of features including the following:

1. Torque loop control for six axes (250 micro sec per 6 axes) for brush and brushless motors;
2. Software adjustable current offset—eliminates potentiometers;
3. Downloadable gains—arm dependent parameters can be downloaded from the SCM board;
4. PWM compensation;
5. Commutation compensation;
6. Current averaging for data logging and other purposes;
7. Current limit check;
8. Velocity monitoring (back emf) for safety check;
9. Energy check (IIT) to test stall condition;
10. Power-up self diagnostics; and
11. Downloadable diagnostics system.

Torque Processor Board

More advanced robot performance is produced by digitally controlling the torque applied at the arm workpoint when the arm is in motion to control the arm workpoint position in accordance with a command trajectory. Axis drive forces are adjusted in accordance with actually experienced workpiece loading to satisfy position and trajectory commands with greater speed accuracy and efficiency. Reference is made to Ser. No. 932,974 for a related invention directed to the control of torque as an end controlled variable.

The torque control is embodied on a generic control circuit board 600 (FIGS. 4, 8A-1 and 8A-2) called a torque processor (TP) board i.e., an electronic board usable to provide torque control for a wide variety of robots having different load capacities, different types of drives, different numbers of axes, etc.

The torque processor board 600 employs digital circuitry to generate voltage commands for each joint motor or axis drive on the basis of torque commands obtained from a higher control level (SCM board) and feedback currents obtained through the arm interface (AIF) board 800 from the axis drives. Thus, the torque control loops for all of the joint motors are closed through the TP board circuitry.

In the case of electric drives, the feedback current is the motor winding current which is proportional to actual motor torque. For hydraulic drives, the feedback signal is also proportional to actual motor torque.

The digital torque control circuitry is preferably structured with multiple digital processors so that needed control computation and control support functions can be achieved for all axes accurately and efficiently within sampling frequency requirements.

In particular, a torque control manager 602 interfaces with a dual port SCM interface memory 604 for the exchange of stored torque control data between the SCM (servo control module) and the TP (torque processor) control levels. Axis torque commands and control loop parameters are downloaded from the SCM to the TP interface memory 604 through a data bus 606 preferably of the VME type. In return, status data is uploaded to the servo control level (SCM). The memory interface 604 between the TP and SCM boards is a dual port shared memory scheme which serves as a slave to the VME bus 606. Other board memories include a ping-pong memory 608, program EPROM, local RAM, and TP calculator memory.

The torque control manager 602 also directs the flow of current feedback from circuitry on the AIF board 800 at the next lower control level to the torque processor board 600 for torque control loop operation. Drive voltage commands resulting from torque control calculations are directed to the arm interface (AIF) board 800 by the torque control manager 602. The ping-pong (bank switched) memory 608 operates under the control of handshake flags to store command, feedback, and status data so that it is available when needed for torque control calculations or for higher control level reporting requirements or for axis drive control.

A coprocessor 610 provided in the form of a digital signal processor operates as a torque loop calculator which receives torque commands and feedback currents from the torque control manager 602 through the ping-pong memory 608, calculates drive voltage commands for the various robot axes from the torque errors computed from the torque commands and feedback currents, and transfers the drive voltage commands through the ping-pong memory 608 to the arm interface circuitry on command from the torque control manager 602.

With the described digital circuit structure, all needed torque control functions are able to be performed rapidly (250 microsecond sampling rate or better) and accurately within frequency response requirements. Specifically, the rapid calculating capability of the digital signal processor 610 is employed for the torque control calculations as the data organizing and directing capability of the torque control manager 602 is employed for most other functions thereby enabling highly improved control performance to be achieved efficiently and economically.

The torque control manager 602 has an architecture well suited for the tasks described for data management but which has a calculating speed (i.e., over 4 microseconds for a 16×16 bit multiplication) too limited to meet torque control bandwidth requirements. The digital signal processor 610 has an architecture set for Z transform calculations (i.e., a calculating speed of 200 nanoseconds for a 16×16 bit multiplication) but which is otherwise generally unsuitable for the kinds of tasks assigned to the data manager processor 602. These two microprocessors function together as a unit or, in other terms, as a servo engine.

For more detail on the torque board circuitry, reference is made to Ser. No. 932,977 or 932,992.

Torque Control Programming

The torque processor board 600 is operated under the control of programs executed in the on board processors 602 and 610 to implement torque command signals from the higher SCM control level.

The torque processor software generally performs the following tasks which are partitioned as indicated:

Torque Control Manager 602

Communication with SCM
Command handling
Current sampling, conversion and offset adjustment
Commutation switch flag (state reading)
Ping-pong memory management
PWM chip management
Diagnostics
Error reporting

Torque Loop Calculator 610 (program cycling based on 250 microsecond interrupt)

Overcurrent check—absolute and average
Torque loop calculations
Current averaging
PWM compensation
Commutation compensation
Back emf check—monitors velocity for safety
Energy check—tests for stall conditions Reference is made to Ser. No. 932,976 for more detail on TP software structure and operation.

Arm Drive Control

Figure 9:
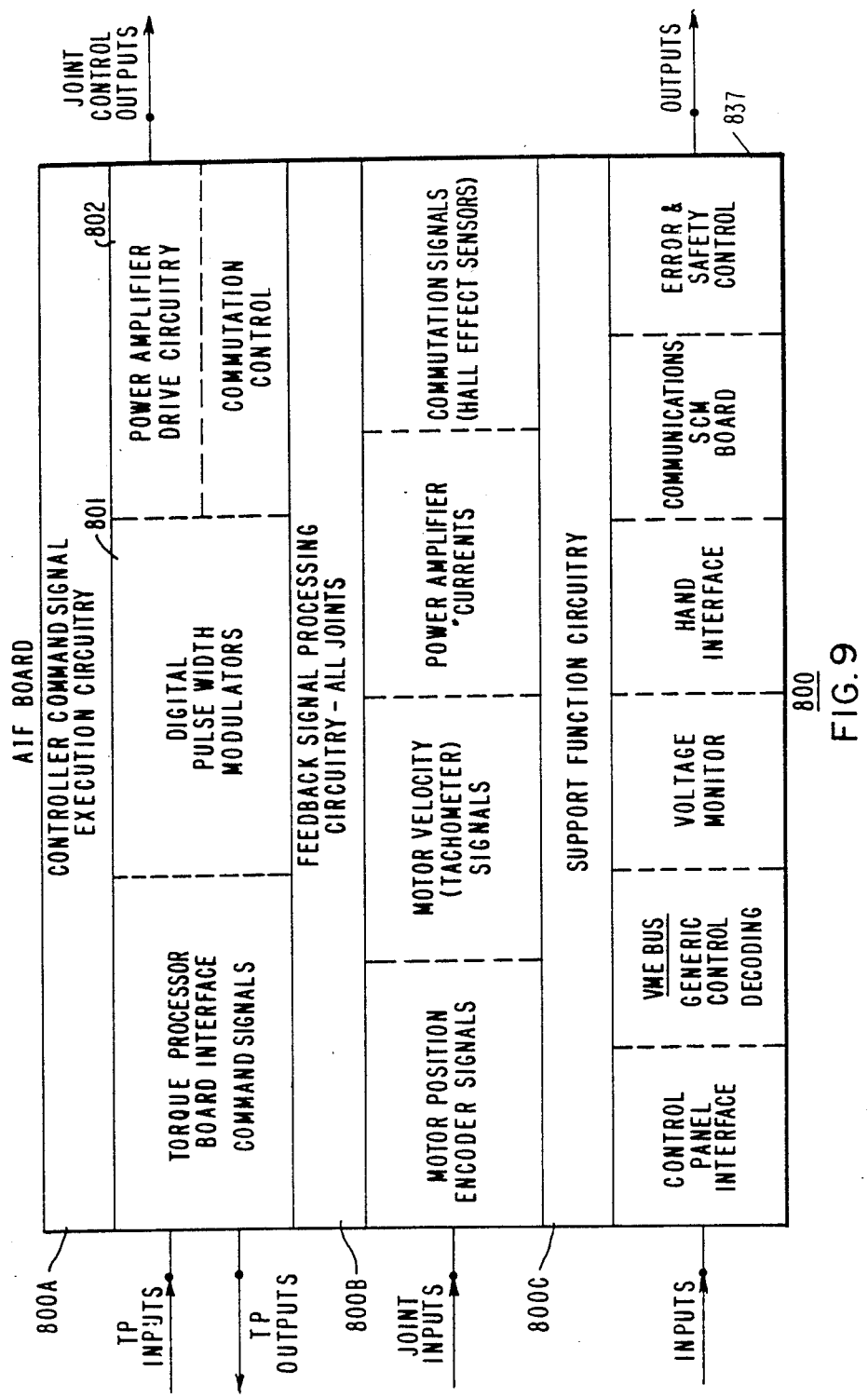

As now further described, with reference to FIG. 9 the higher level control looping generates voltage command signals to be executed through the AIF board 800 for the arm axes so that the arm effector is moved to commanded positions under controlled velocity, acceleration and torue in accordance with a user's robot program. Pulse width modulation circuitry 801 and drive circuitry 802 are provided on the AIF board 800 to develop axis drive signals, in this instance for application to power amplifiers which provide the drive currents to DC brushless electric motors respectively associated with the six axes of arm motion.

The AIF board circuitry processes the voltge command data to develop digital TTL logic level signals to control the base or gate drive circuitry of the power amplifiers which supply the motor drive currents to the axis motors. As previously indicated, the motor currents and axis position and velocity data are fed back through the AIF board 800 to the higher level control loops for closed loop position, velocity and torque control.

AIF Board—Pulse Width Modulation Scheme

The pulse width modulation circuitry 801 on the AIF board 800 provides a digital interface for closing the torque or current control loop through the axis motor drive circuitry. The pulse width modulation concept is applied to control the conduction time width for the joint motor power switches and thereby satisfying motor voltage and torque commands.

Figure 10:
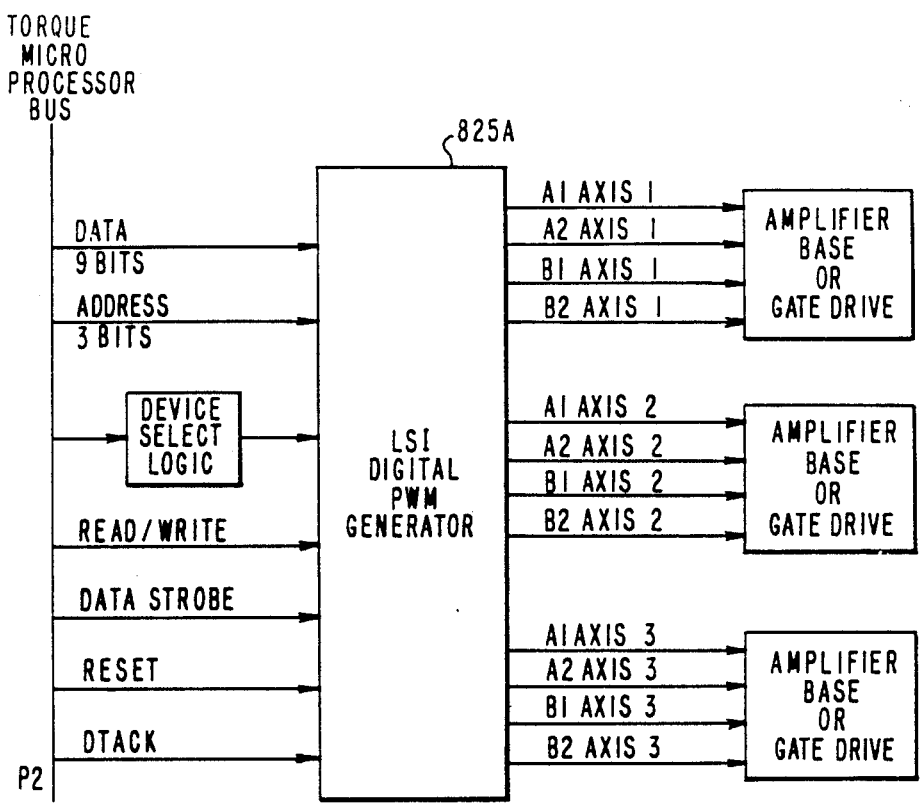

As shown in the generalized block diagram of FIG. 10, a digital PWM generator 825A receives 9 bit data commands and 3 register address bits on the torque microprocessor P2 bus. Additionally, device select logic, read/write, reset (initialization) and data strobe signals are received from the P2 bus. A DTACK (acknowledge) signal is returned to the bus by the PWM generator 825A after each reception from the torque calculator on the torque processor board.

The digital PWM generator 825A is preferably arranged to service three axes where, for example, either brushless or brush type DC motors are employed as the axis drives. Thus, a set of digital signals (in this instance four such signals A1, A2, B1, B2) is generated for controlling the amplifier base or gate drive circuitry associated with each axis motor whether the motor is the brushless type or the DC brush type.

Figure 11A:
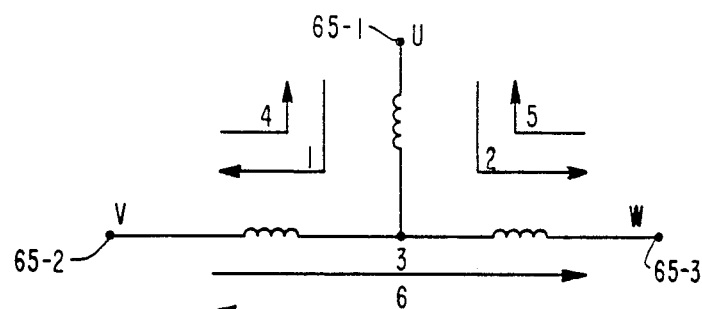
FIGS. 11A-11B and 12, respectively, show DC brushless and brush-type DC motor bridge circuits.
Figure 11B:
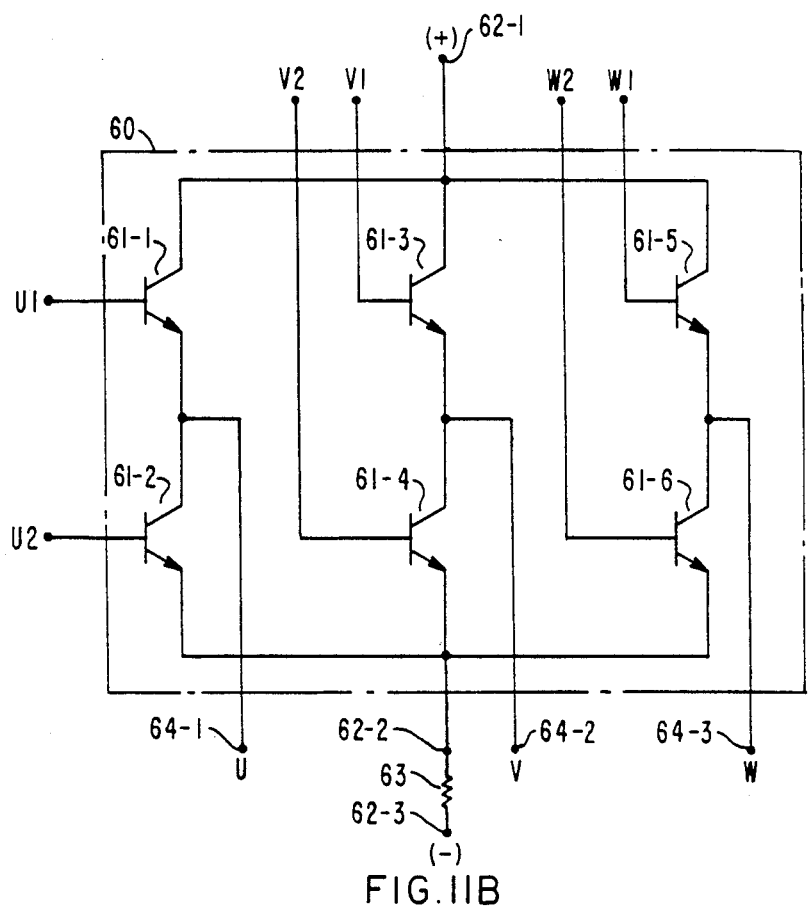

Four digital PWM control signals are employed to control the direction and magnitude of current flow through the motor windings through on/off power switch control. In the brushless DC motor embodiment, the three phase windings of the brushless DC motor are interconnected in a bridge circuit (FIGS. 11A and 11B) such that the motor drive current is always directed through a pair of windings and the motor conduction path is rotated or commutated through successive winding pairs to produce the motor drive torque. In this arrangement, the PWM pulses determine the time span of motor current flow and commutation switching logic based on the PWM pulses and Hall effect sensor feedback signals determine the winding pairs through which, and the direction in which, drive current is to flow.

Figure 12:
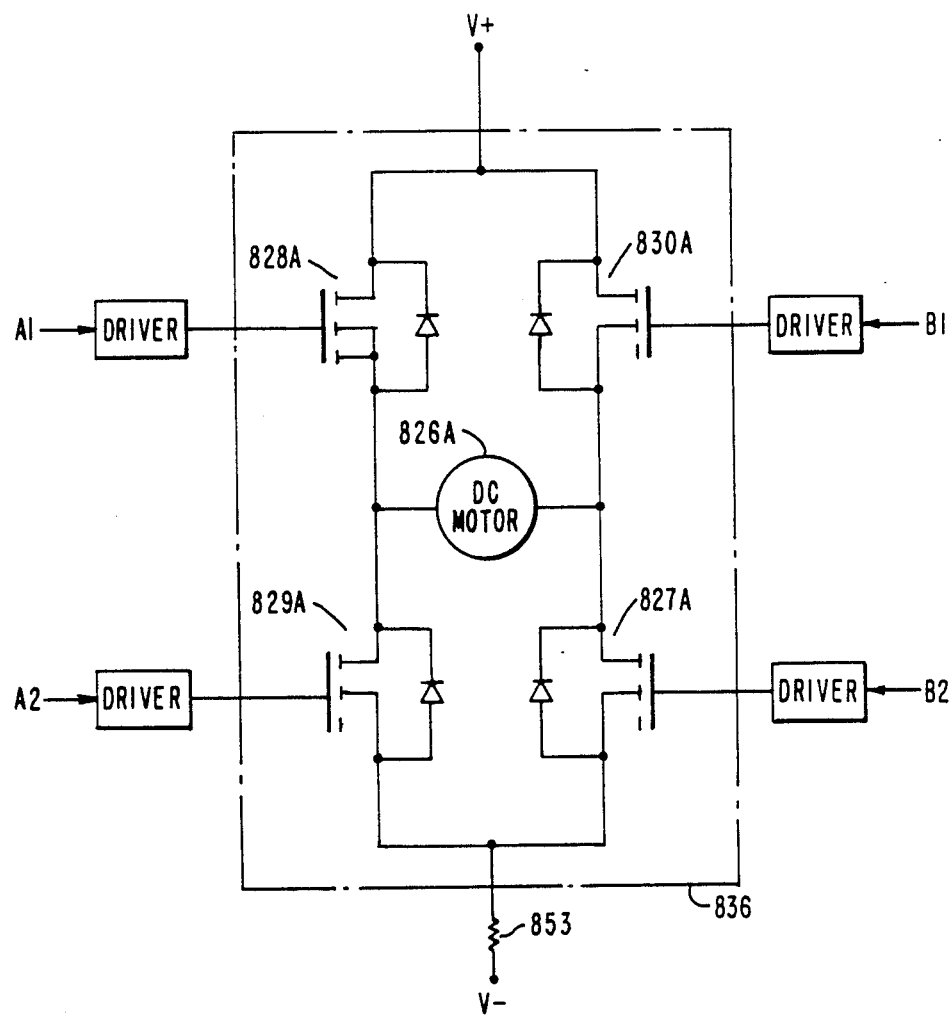

In the DC brush type embodiment where an H type power amplifier bridge circuit is employed, DC brush type motor 826A (FIG. 12) is operated in one direction when power amplifier switches 827A and 828A are opened under control of PWM output signals A1 and B2, and it is operated in the opposite direction when power amplifier switches 829A and 830A are opened under control of PWM output signals B1 and A2.

The pulse width modulation circuitry is preferably embodied in a pair of large scale integrated pulse width modulation (PWM) chips. Generally, each PWM chip operates as a microprocessor peripheral device (i.e., under the control of a microprocessor higher in the control loop configuration) to provide digital pulse width modulated signal generation for control of three axes having DC brush type motor drives.

For more detail on motor current, position and velocity feedback and other AIF board circuitry reference is made to Ser. No. 932,982. For more detail on the PWM scheme reference is made to Ser. No. 932,841.

What is claimed is:

1. A digital control for a robot having a plurality of arm joints, said control comprising:
   an electric motor for driving each of the robot arm joints;
   a power amplifier operable to supply drive current to each motor;
   each joint motor having digital feedback control loop means operable at a predetermined sampling rate and including digital position and velocity control loops driving a digital torque control loop in accordance with digital position commands to generate digital motor voltage commands for controlling the associated power amplifier;
   means for sensing the motion of each joint motor and for generating corresponding digital position and primary velocity feedback signals for control calculations in said position and velocity control loops;
   means for generating digital signals representative of the respective joint motor drive currents for control calculations in said torque control loop; and
   backup velocity monitoring means independently determining the velocity of each joint motor from the motor current and terminal voltage and the motor inductance and resistance; and
   means for comparing said primary and backup velocity signals for each joint motor.

2. A digital robot control as set forth in claim 1 wherein means are provided for shutting down the robot operation if the difference between the primary and backup voltages for any joint motor exceeds a predetermined limit.

3. A digital robot control as set forth in claim 1 wherein the motor current and voltage values are average values computed for a predetermined time period next preceding the current control cycle.

4. A digital robot control as set forth in claim 1 wherein the following formula is employed in the backup velocity calculation:

$$VEL = w*Ke = Vin - (L*di/dt + iR)$$

where:
   R = motor resistant [ohm]
   L = motor inductance [H]
   Vin = motor terminal voltage [V]
   Ke = motor Back-emf constant [V/rad/sec]
   w = motor velocity [rad/sec]
   i = motor current [A]

5. A digital robot control as set forth in claim 1 wherein each of said motor torque control loops includes torque servo control means having microprocessor means for generating motor voltage commands from torque commands and motor current feedback signals; and
   another servo control means having another microprocessor means included in each of said motor velocity control loops and generating torque commands in response to position and velocity commands and position and velocity feedback signals.

6. A digital robot control as set forth in claim 5 wherein said torque microprocessor means includes said backup velocity monitoring means and said other microprocessor means includes said comparing means.

7. A digital robot control as set forth in claim 6 wherein said other microprocessor means further includes means for shutting down the robot operation if the difference between the primary and backup voltages for any joint motor exceeds a predetermined limit.

8. A robot comprising:
   an arm having a plurality of joints;
   an electric motor for driving each of the robot arm joints;
   a power amplifier operable to supply drive current to each motor;
   each joint motor having digital feedback control loop means operable at a predetermined sampling rate and including digital position and velocity control loops driving a digital torque control loop in accordance with digital position commands to generate digital motor voltage commands for controlling the associated power amplifier;
   means for sensing the motion of each joint motor and for generating corresponding digital position and primary velocity feedback signals for control calculations in said position and velocity control loops;
   means for generating digital signals representative of the respective joint motor drive currents for control calculations in said torque control loop; and
   backup velocity monitoring means independently determining the velocity of each joint motor from the motor current and terminal voltage and the motor inductance and resistance; and
   means for comparing said primary and backup velocity signals for each joint motor.

9. A robot as set forth in claim 8 wherein means are provided for shutting down the robot operation if the difference between the primary and backup voltages for any joint motor exceeds a predetermined limit.

10. A robot as set forth in claim 8 wherein each of said motor torque control loops includes torque servo control means having microprocessor means for generating motor voltage commands from torque commands and motor current feedback signals; and
   another servo control means having another microprocessor means included in each of said motor velocity control loops and generating torque commands in response to position and velocity commands and position and velocity feedback signals.

* * * * *